United States Patent
Yamagata

(10) Patent No.: US 7,324,239 B2
(45) Date of Patent: Jan. 29, 2008

(54) IMAGE FORMING DEVICE CAPABLE OF PREVENTING PRINT OVERRUN

(75) Inventor: Kazuhiro Yamagata, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 877 days.

(21) Appl. No.: 10/795,412

(22) Filed: Mar. 9, 2004

(65) Prior Publication Data

US 2004/0190024 A1    Sep. 30, 2004

(30) Foreign Application Priority Data

Mar. 28, 2003 (JP) .............................. 2003-092241

(51) Int. Cl.
H04N 1/387 (2006.01)
H04N 1/407 (2006.01)
H04N 1/56 (2006.01)
G06T 11/00 (2006.01)

(52) U.S. Cl. ................. 358/1.9; 358/1.2; 358/3.01; 358/3.26; 358/521; 715/911

(58) Field of Classification Search .......... 358/1.9, 358/3.01, 1.2, 3.26, 1.13–1.17, 521, 528; 711/526, 911

See application file for complete search history.

(56) References Cited

U.S. PATENT DOCUMENTS

| | | | | | |
|---|---|---|---|---|---|
| 5,129,049 A | * | 7/1992 | Cuzzo et al. | ............... | 358/1.14 |
| 5,602,976 A | * | 2/1997 | Cooper et al. | ............. | 358/1.17 |
| 5,913,018 A | * | 6/1999 | Sela | ........................... | 358/1.17 |
| 5,982,391 A | * | 11/1999 | Oki | ............................ | 358/1.15 |
| 6,181,435 B1 | * | 1/2001 | Onodera | .................... | 358/1.14 |
| 6,963,412 B1 | * | 11/2005 | Toda | ......................... | 358/1.13 |

FOREIGN PATENT DOCUMENTS

| | | | |
|---|---|---|---|
| JP | 11048543 A | * | 2/1999 |
| JP | B2 2978823 | | 9/1999 |
| JP | A 2000-253223 | | 9/2000 |
| JP | A 2001-10123 | | 1/2001 |

* cited by examiner

Primary Examiner—Scott A. Rogers
(74) Attorney, Agent, or Firm—Oliff & Berridge, PLC

(57) ABSTRACT

Print data received from a host computer is divided into five bands, and expansion time required for expanding the print data is estimated. If it is determined based on the estimated expansion time that a print overrun would occur, grayscale depth during the expansion of the print data is reduced by two bits at a time, in the priority sequence of yellow, cyan, then magenta, until it can be determined that a print overrun will not occur.

23 Claims, 7 Drawing Sheets

IMAGE FORMING DEVICE CAPABLE OF PREVENTING PRINT OVERRUN

BACKGROUND OF THE INVENTION

1. Field of the Invention

The present invention relates to an image forming device that forms images by expanding image data into bitmap data.

2. Related Art

Various image forming devices are known in the art, such as a color laser printer. The color laser printer receives image data representing a color image from a host computer and divides the image data into a plurality of bands in one-page units. Then, the color laser printer expands the image data into bitmap data for each color in each band and prints the image onto paper based on the bitmap data.

To reduce the amount of memory required in such an image forming device, printing starts based on bitmap data that has already been expanded before all of the one-page worth of image data has been expanded into bitmap data. Therefore, if more time than that necessary for the expansion into bitmap data is required, then the bitmap data is interrupted during the printing, which leads to a problem called print overrun in which the printing onto the paper does not proceed normally.

A printer disclosed in Japanese Patent Application-Publication No. 2001-10123 proceeds expansion process for each color in parallel by dedicated color hard renderers and, in order to prevent print overruns, estimates the time required for the expansion process for each color in each band, and then modifies the expansion process that is allocated to the different hard renderers for each band, based on the estimated time.

In this printer, however, it is necessary to curtail the time required for the expansion process by reducing the resolution for each color if it is not possible to prevent the occurrence of a print overrun even by modifying the expansion process allocated to the hard renderers. In such a case, a problem occurs in that the appearance of a printed image is greatly degraded.

SUMMARY OF THE INVENTION

In the view of foregoing, it is an object of the present invention to overcome the above problems, and also to provide an image forming device that restricts degradation in appearance of printed image when time required for expansion process is curtailed.

In order to achieve the above and other objects, the present invention provides an image forming device including an expansion unit that performs an expansion process for expanding drawing data representing a color image, which is expressed by a plurality of colors, into bitmap data at a resolution and a grayscale depth, an image forming unit that forms an image based on the bitmap data, a calculating unit that calculates an estimated expansion time required by the expansion unit to perform the expansion process for at least part of the drawing data, a determining unit that determines based on the estimated expansion time whether or not the image forming unit can form the image normally, and a reducing unit that reduces at least one of the resolution and the grayscale depth for at least one of the plurality of colors at which the expansion unit performs the expansion process if the determining unit determines that the image forming unit cannot form the image normally.

There is also provided an image forming device including an expansion unit that performs an expansion process for expanding drawing data representing a color image, which is expressed by a plurality of colors, into bitmap data at a resolution and a grayscale depth, an image forming unit that forms an image based on the bitmap data, a calculating unit that calculates a remaining time by subtracting an expansion time required for the expansion process that has already been performed by the expansion unit from an expansion time limit, a determining unit that determines whether or not the remaining time is less than a predetermined reference expansion time, and a reducing unit that reduces at least one of the resolution and the grayscale depth at which the expansion unit performs the expansion process for at least one of the plurality of colors, if the determining unit determines that the remaining time is less than the predetermined reference expansion time.

PREFERRED EMBODIMENTS OF THE PRESENT INVENTION

Next, preferred embodiments of the present invention will be described with reference to the attached drawings.

Figure 1:
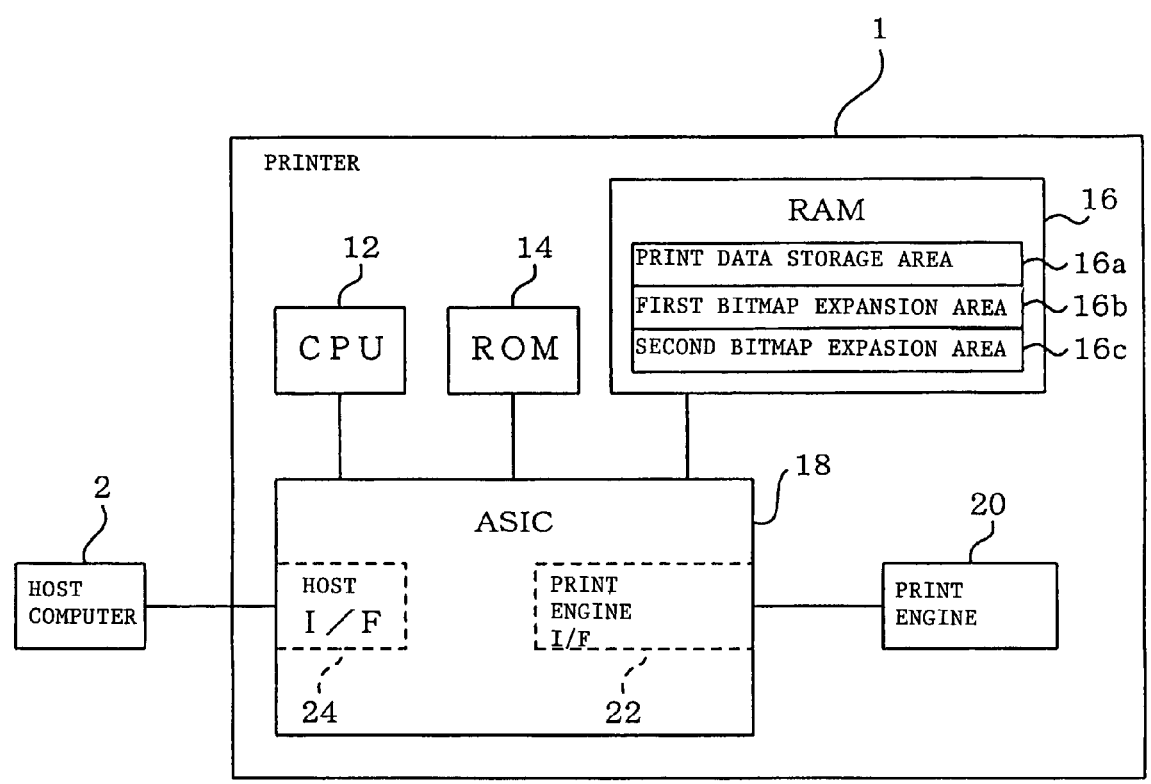
FIG. 1 is a block diagram of a color laser printer according to a first embodiment of the present invention.

FIG. 1 is a block diagram of a color laser printer 1 according to a first embodiment of the present invention.

As shown in FIG. 1, the color laser printer 1 includes a central processing unit (CPU) 12, a read only memory (ROM) 14, a random access memory (RAM) 16, application specific integrated circuits (ASIC) 18, and a print engine 20. The ASIC 18 is an IC that connects together the CPU 12, the ROM 14, the RAM 16, and the print engine 20, and the ASIC 18 is provided with a print engine interface 22 for communication with the print engine 20. The ASIC 18 is also provided with a host interface 24 for communication between the color laser printer 1 and a separate host computer 2.

The print engine 20 is a tandem-type print engine that forms a color image onto a recording sheet that is successively transported at fixed speed, by transferring toner images of print colors yellow (Y), magenta (M), cyan (C), and black (K) in order onto the recording sheet.

Figure 2:
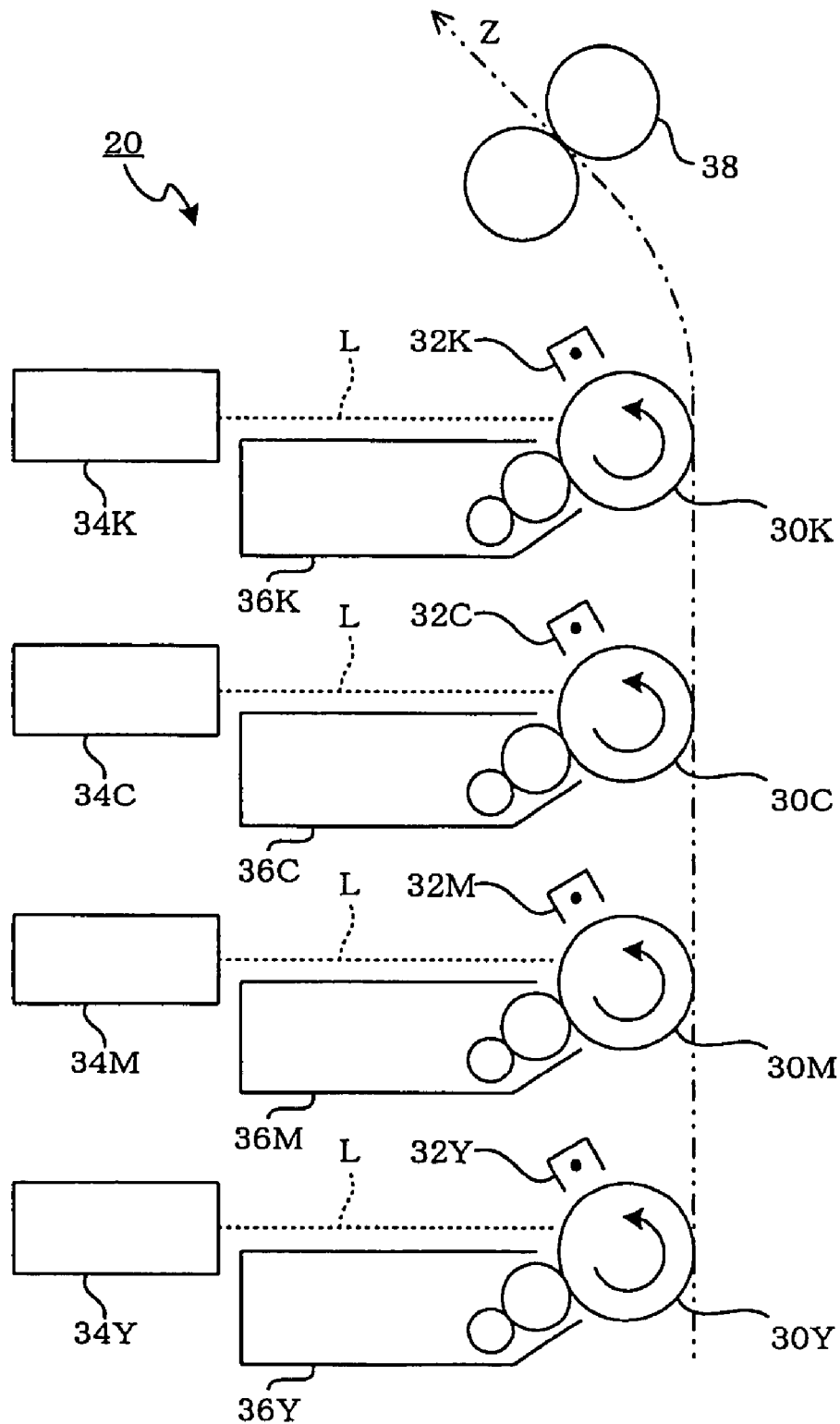
FIG. 2 shows configuration of a print engine of the color laser printer of FIG. 1.

A printing operation of the print engine 20 will be briefly described. As shown in FIG. 2, the print engine 20 includes four photosensitive drums 30Y, 30M, 30C, and 30K, each corresponding to one of the print colors. The photosensitive drums 30Y, 30M, 30C, and 30K are arranged in this order along a sheet feed direction Z in which the recording sheet is transported. During the printing operation, the surfaces of the photosensitive drums 30Y, 30M, 30C, 30K are uniformly charged by corresponding chargers 32Y, 32M, 32C, 32K. Then, laser scanner units 34Y, 34M, 34C, 34K irradiate laser light beams onto the surfaces of the corresponding photosensitive drums 30Y, 30M, 30C, 30K so as to form electrostatic latent images for each color on the surfaces of the photosensitive drums 34Y, 34M, 34C, 34K. Developing units 36Y, 36M, 36C, 36K supply toner of each color onto the electrostatic latent images on the photosensitive drums 34Y, 34M, 34C, 34K to develop the electrostatic latent images into toner images of each color. These toner images are sequentially transferred onto a recording sheet being transported in the sheet feed direction Z, and then fixed onto the recording sheet at a fixing device 38. In this manner, a color image is printed on the recording sheet.

The host computer 2 is connected to the color laser printer 1 in such a manner as to enable communications. A printer driver is installed in the host computer 2 to perform process for transferring image data representing a color image to be printed by the color laser printer 1 (hereinafter referred to as "print data"). Together with the print data, the print driver transmits print setting indication information that indicates print settings (such as resolution and grayscale depth) for printing the image represented by the print data.

Note that the image data expresses the details of an image by using a plurality of different types of drawing command.

If the drawing command "line" is taken as an example, drawing data having drawing parameters "100, 450, 300, 50" represents the image of a line connecting two points that have coordinates (100, 450) and (200, 50).

If the drawing command "box" is taken as an example, drawing data having drawing parameters "50, 200, 250, 400" represents the image of a rectangle having apexes that have coordinates (50, 200) and (250, 400).

When print data is received from the host computer 2 through the host interface 24 of the ASIC 18, the CPU 12 of the color laser printer 1 temporarily stores the print data into a print data storage area 16a in the RAM 16. Then, the CPU 12 expands the print data into a first bitmap expansion area 16b and a second bitmap expansion area 16c in the RAM 16, in accordance with the resolution and grayscale depth indicated by the print settings indication information that is transmitted in together with the print data. More specifically, the print data is expanded into bitmap data corresponding to each of the print colors yellow (Y), magenta (M), cyan (C), and black (K).

Then, each of the laser scanner units 34Y, 34M, 34C, and 34K of the print engine 20 (FIG. 2) performs scanning by the laser beam L based on the bitmap data for each of these print colors, so that an electrostatic latent image (and then a toner image) is formed in accordance with the bitmap data for each print color.

Figure 3:
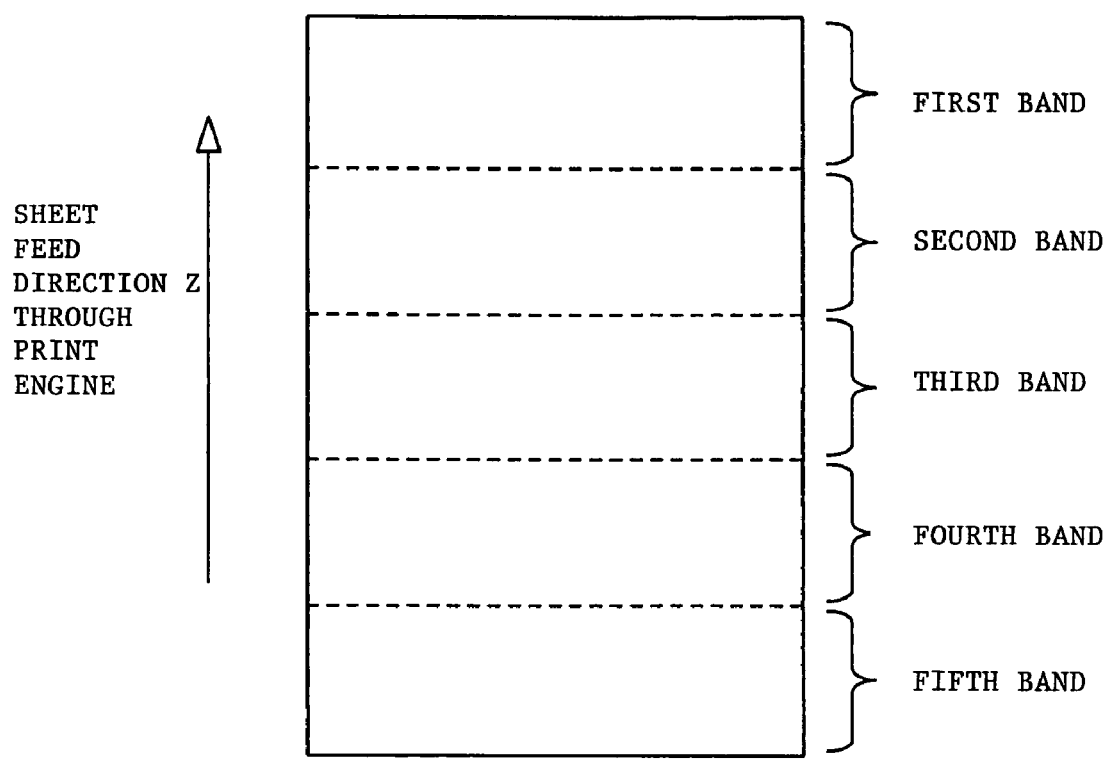
FIG. 3 is illustrative of the division of a one-page image into five bands.

To reduce the amount of memory used by the color laser printer 1, the first bitmap expansion area 16b and the second bitmap expansion area 16c in the RAM 16 are each set to be so small, the areas 16b and 16c cannot hold enough bitmap data for an image of one page, and thus it is not possible to expand the print data for one page at the same time. For this reason, in the color laser printer 1 of this embodiment, as shown in FIG. 3, one-page worth of image data is divided into a plurality of (five in this embodiment) bands (areas) in the sheet feed direction Z in which the recording sheet is fed through the print engine 20, and expansion process of the print data corresponding to each band is performed sequentially in parallel with the printing by the print engine 20. More specifically, the print data for the first band is expanded into the first bitmap expansion area 16b, in the sequence of yellow (Y), magenta (M), cyan (C), and black (K). Then, the print data for the second band is expanded in the second bitmap expansion area 16c. During that time, the bitmap data stored in the first bitmap expansion area 16b (the bitmap data for the first band) is output to the print engine 20. Subsequently, the print data for the third band is expanded in the first bitmap expansion area 16b. During that time, the bitmap data stored in the second bitmap expansion area 16c (the bitmap data for the second band) is output to the print engine 20. The expansion process and the printing operation proceed in parallel by repetition of these operations. Thus, the first bitmap expansion area 16b and the second bitmap expansion area 16c can each be set to a capacity sufficient to store the bitmap data for one band (four colors).

However, if the expansion process takes too much time with this method, the bitmap data necessary for the print operation in the print engine 20 will not arrive in time, and a print overrun will occur.

In the color laser printer 1 of the present embodiment, the CPU 12 executes a grayscale depth modification process for curtailing the expansion time so as to prevent the occurrence of a print overrun if it is estimated that the expansion time will be longer.

Figure 4:
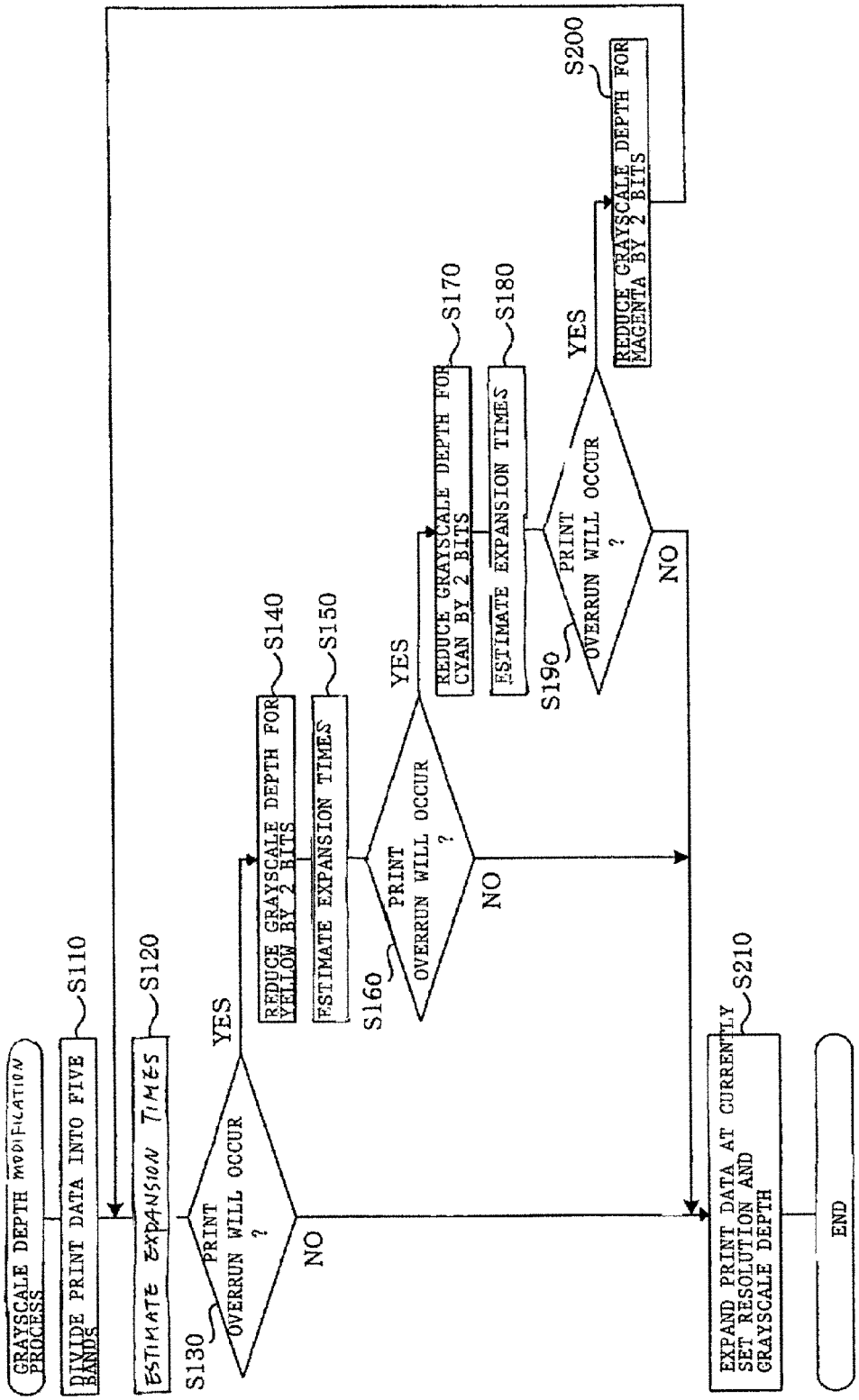
FIG. 4 is a flowchart representing a grayscale depth modification process according to the first embodiment of the present invention.

Next, the grayscale depth modification process will be described with reference to the flowchart of FIG. 4. Note that the grayscale depth modification process is started when print data is received from the host computer 2 and is executed in one-page units.

When the grayscale depth modification process starts, first in S110, the print data received from the host computer 2 is divided into five bands (FIG. 3). Next, in S120, time required for expanding the print data (expansion time) is estimated for each band. More specifically, a first estimated expansion time $T_1$, a second estimated expansion time $T_2$, a third estimated expansion time $T_3$, a fourth estimated expansion time $T_4$, a fifth estimated expansion time $T_5$ are calculated. The first estimated expansion time $T_1$ is an estimated time required from the start of the expansion process until the end of the expansion process for the print data for the first band. The second estimated expansion time $T_2$ is an estimated time required from the start of the expansion process until the end of the expansion process for the print data for the second band. The third estimated expansion time $T_3$ is an estimated time required from the start of the expansion process until the end of the expansion process for the print data for the third band. The fourth estimated expansion time $T_4$ is an estimated time required from the start of the expansion process until the end of the expansion process for the print data for the fourth band. The fifth estimated expansion time $T_5$ is an estimated time required from the start of the expansion process until the end of the expansion process for the print data for the fifth band.

Figure 5:
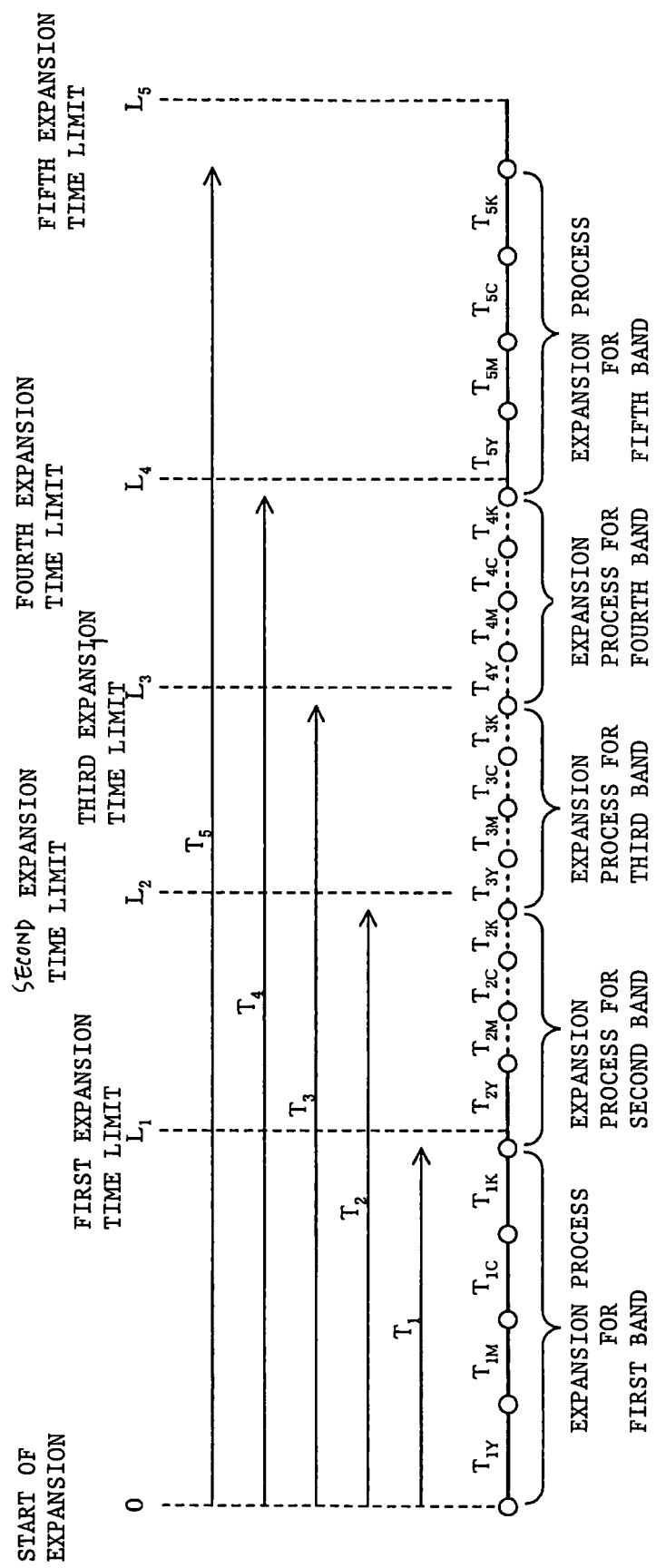
FIG. 5 is illustrative of the estimated expansion times.

Here, as shown in FIG. 5, the first estimated expansion time $T_1$ is the total of color-specific estimated expansion times $T_{1Y}$, $T_{1M}$, $T_{1C}$, and $T_{1K}$ that are estimates of the times required to expand the print data for the first band into bitmap data for each of the colors yellow (Y), magenta (M), cyan (C), and black (K). Thus, the first estimated expansion time $T_1$ can be obtained by obtaining the color-specific estimated expansion times $T_{1Y}$, $T_{1M}$, $T_{1C}$, and $T_{1K}$.

The second estimated expansion time $T_2$ is the sum of the first estimated expansion time $T_1$ plus the total of color-specific estimated expansion times $T_{2Y}$, $T_{2M}$, $T_{2C}$, and $T_{2K}$ that are estimates of the times required to expand the print data for the second band into bitmap data for each of the colors yellow (Y), magenta (M), cyan (C), and black (K). Thus, the second estimated expansion time $T_2$ can be obtained by obtaining the color-specific estimated expansion times $T_{2Y}$, $T_{2M}$, $T_{2C}$, and $T_{2K}$.

The third estimated expansion time $T_3$ is the sum of the second estimated expansion time $T_2$ plus the total of color-specific estimated expansion times $T_{3Y}$, $T_{3M}$, $T_{3C}$, and $T_{3K}$ that are estimates of the times required to expand the print data for the third band into bitmap data for each of the colors yellow (Y), magenta (M), cyan (C), and black (K). Thus, the third estimated expansion time $T_3$ can be obtained by obtaining the color-specific estimated expansion times $T_{3Y}$, $T_{3M}$, $T_{3C}$, and $T_{3K}$.

The fourth estimated expansion time $T_4$ is the sum of the third estimated expansion time $T_3$ plus the total of color-specific estimated expansion times $T_{4Y}$, $T_{4M}$, $T_{4C}$, and $T_{4K}$ that are estimates of the times required to expand the print data for the fourth band into bitmap data for each of the colors yellow (Y), magenta (M), cyan (C), and black (K). Thus, the fourth estimated expansion time $T_4$ can be obtained by obtaining the color-specific estimated expansion times $T_{4Y}$, $T_{4M}$, $T_{4C}$, and $T_{4K}$.

The fifth estimated expansion time $T_5$ is the sum of the fourth estimated expansion time $T_4$ plus the total of color-specific estimated expansion times $T_{5Y}$, $T_{5M}$, $T_{5C}$, and $T_{5K}$ that are estimates of the times required to expand the print data for the fifth band into bitmap data for each of the colors yellow (Y), magenta (M), cyan (C), and black (K). Thus, the fifth estimated expansion time $T_5$ can be obtained by obtaining the color-specific estimated expansion times $T_{5Y}$, $T_{5M}$, $T_{5C}$, and $T_{5K}$.

Note that the time required for expanding the print data into bitmap data depends on factors, such as the contents of the print data and the resolution and grayscale depth that have been set. More specifically, the expansion time will tend to increase as the number of drawing commands in the print data increases and as the resolution and grayscale depth increase. Therefore, the color laser printer 1 of this embodiment calculates the color-specific estimated expansion times as described below.

That is, for each of a plurality of different types of drawing command used in the drawing data, the color laser printer 1 has stored therein a target time that acts as a target during the expansion of the image expressed by the drawing data into bitmap data, corresponding to each of a plurality of varieties of resolutions and grayscale depths. Note that these target times are determined in such a manner that they become longer as the contents of the drawing commands become more complicated and as the resolution and grayscale depth increase.

Then, the target times corresponding to the drawing commands included within the print data (specifically, the target times corresponding to the currently set resolution and grayscale depth) are added up, for the print data corresponding to each print color of each band. This makes it possible to calculate the color-specific estimated expansion times in accordance with the contents of the print data and the currently set resolution and grayscale depth.

Note that the calculation of the color-specific estimated expansion times is not limited to the method described above. For example, it is possible to estimate the expansion times more accurately if the calculations also took into account the values of drawing parameters used in the drawing commands, in addition to the types of drawing commands.

After the expansion times have been estimated in S120, the process proceeds to S130 where it is determined whether or not a print overrun would occur in the print engine 20 if expansion process were done by the expansion times that were estimated in S120.

More specifically, a first expansion time limit $L_1$, a second expansion time limit $L_2$, a third expansion time limit $L_3$, a fourth expansion time limit $L_4$, and a fifth expansion time limit $L_5$ are previously determined on the basis of conditions, such as the timing at which sheet feed starts in the print engine 20 and the sheet feed speed. These are time limits that make it possible to prevent the occurrence of print overrun during the expansion process that is executed in the sequence of the print data for the first band, the print data for the second band, the print data for the third band, the print data for the fourth band, and finally the print data for the fifth band, as shown in FIG. 5. The first expansion time limit $L_1$ is a time limit from the start of expansion process to the end of expansion process for the print data for the first band (in other words, the time limit corresponding to the first estimated expansion time $T_1$). The second expansion time limit $L_2$ is a time limit from the start of expansion process to the end of expansion process for the print data for the second band (in other words, the time limit corresponding to the second estimated expansion time $T_2$). The third expansion time limit $L_3$ is a time limit from the start of expansion process to the end of expansion process for the print data for the third band (in other words, the time limit corresponding to the third estimated expansion time $T_3$) The fourth expansion time limit $L_4$ is a time limit from the start of expansion process to the end of expansion process for the print data for the fourth band (in other words, the time limit corresponding to the fourth estimated expansion time $T_4$) The fifth expansion time limit $L_5$ is a time limit from the start of expansion process to the end of expansion process for the print data for the fifth band (in other words, the time limit corresponding to the fifth estimated expansion time $T_5$).

It is determined (a) whether or not the first estimated expansion time $T_1$ exceeds the first expansion time limit $L_1$, (b) whether or not the second estimated expansion time $T_2$ exceeds the second expansion time limit $L_2$, (c) whether or not the third estimated expansion time $T_3$ exceeds the third expansion time limit $L_3$, (d) whether or not the fourth estimated expansion time $T_4$ exceeds the fourth expansion time limit $L_4$, and (e) whether or not the fifth estimated expansion time $T_5$ exceeds the fifth expansion time limit $L_5$.

Then, if the estimated expansion time is equal to or less than the corresponding expansion time limit for all of the above criteria (a) to (e), then it is determined in S130 that a print overrun would not occur (S130:NO). On the other hand, if an estimated expansion time exceeds the corresponding expansion time limit for any one of the above criteria (a) to (e), then it is determined in S130 that a print overrun would occur (in other words, that the printing of the image onto the recording sheet would not be performed normally) (S130:YES).

If it is determined in S130 that a print overrun would occur (S130:YES), then the process proceeds to S140 in which the grayscale depth used during the expansion of the print data for the yellow (Y) image is reduced by 2 bits. For example, if the currently set grayscale depth is 8 bits, then the grayscale depth is reduced to 6 bits.

Next in S150, the expansion times are estimated by the same method as that of S120. However, because the settings of the grayscale depths is not changed in S140 for colors other than yellow (Y), the previously calculated color-specific estimated expansion times can be used for colors other than yellow (Y), and thus the calculation time is shortened in comparison with the case in which all the color-specific estimate expansion times are calculated.

In S160, it is determined whether or not a print overrun would occur if the expansion process were done by the expansion times estimated in S150, by the same method as that of S130. If it is determined in S160 that a print overrun would occur (S160:YES), then the process proceeds to S170 in which the grayscale depth used during the expansion of the print data for the cyan (C) image is reduced by 2 bits.

In S180, the expansion times are estimated by the same method as that of S120. However, because the settings of the grayscale depths is not changed in S170 for colors other than cyan (C), the previously calculated color-specific estimated expansion times for colors other than cyan (C) can be used. Therefore, the calculation time can be curtailed in comparison with the case in which all the color-specific estimated expansion times are calculated.

In S190, it is determined whether or not a print overrun would occur if the expansion process were done by the expansion times estimated in S180, by the same method as that of S130. If it is determined in S190 that a print overrun would occur (S190:YES), then the process proceeds to S200. In S200, the grayscale depth used during the expansion of the print data for the magenta (M) image is reduced by 2 bits. Then, the process returns to S120, and the previously described process is performed.

On the other hand, if it is determined in S130, S160, or S190 that a print overrun would not occur (S130:NO, S160:NO, S190:NO), then the process proceeds to S210. In S210, the process is executed for expanding the print data into bitmap data at the currently set resolution and grayscale depth (process for expanding the print data for each band into bitmap data in the order of the print data for the first band, the print data for the second band, the print data for the third band, the print data for the fourth band, and then the print data for the fifth band). Then, the grayscale depth modification process ends. Note that the expanded bitmap data for each band is output sequentially to the print engine 20, and printing is performed by the print engine 20 based on the bitmap data.

As described above, in the color laser printer 1 of this embodiment, if it is determined that a print overrun would occur, then the grayscale depth for each color is reduced in the priority of yellow (Y), cyan (C), then magenta (M) by minimum amount, until it can be determined that a print overrun will not occur.

This makes it possible to restrict any degradation in the quality of the printed image, in comparison with a method in which the grayscale depths of all of a plurality of colors are reduced during the expansion process. It is therefore possible to restrict any degradation of the quality of the printed image, even if the time required for the expansion process is curtailed. This makes it possible to ensure that the quality of the image to be printed is not degraded unnecessarily.

Because a color priority sequence for the reduction has been determined beforehand based on the quality of printed images obtained when the grayscale depth has been actually reduced for each color, a color of which grayscale depth should be reduced can be efficiently selected during the grayscale depth modification process.

Since the grayscale depth is reduced first for colors for which any drop in grayscale depth is difficult for the human eye to see, any deterioration of the image can be restricted.

Since the grayscale depth is reduced gradually (such as by 2 bits at a time) in the color laser printer 1 of the embodiment, the grayscale depth can be reduced in accordance with the length of the expansion time.

In the above embodiment, the expansion times are estimated before the expansion of the print data starts (S120), and the grayscale depths are reduced in the sequence of yellow (Y), cyan (C), then magenta (M), in accordance with the results of those estimates (S130 to S200). However, the present invention is not limited thereto. For example, the CPU 12 can perform a yellow grayscale depth modification process shown in FIG. 6, instead of the previously-described grayscale depth modification process (FIG. 4).

Figure 6:
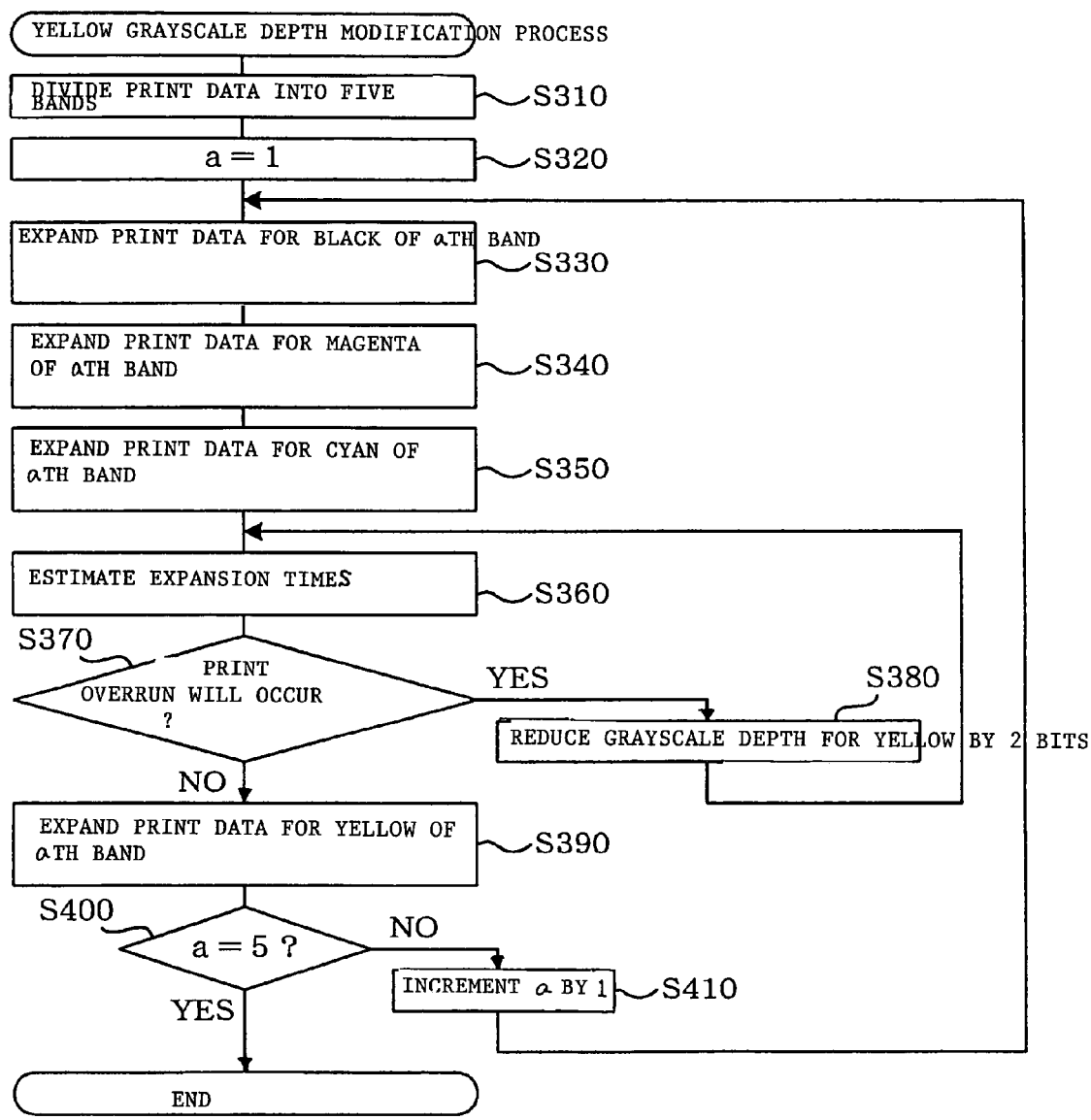
FIG. 6 is a flowchart representing a yellow grayscale depth modification process according to a second embodiment of the present invention.

The yellow grayscale depth modification process according to a second embodiment will be described with reference to the flowchart of FIG. 6. The yellow grayscale depth modification process is started when print data is received from the host computer 2 and is executed in one-page units.

When the yellow grayscale depth modification process starts, first in S310, the print data received from the host computer 2 is divided into five bands (FIG. 3) in the same manner as in the above-described grayscale depth modification process. In S320, a counter a is set to 1.

In S330, the print data for the ath band (the first band, if this is immediately after the start of the yellow grayscale depth modification process) is expanded to bitmap data for black (K) at the currently set resolution and grayscale depth.

In S340, the print data for the ath band (the same band as that in S330) is expanded to bitmap data for magenta (M) at the currently set resolution and grayscale depth.

In S350, the print data for the ath band (the same band as that in S330) is expanded to bitmap data for cyan (C) at the currently set resolution and grayscale depth.

In S360, the expansion time required for the expansion process of the print data is calculated. More specifically, an ath estimated expansion time $T_a$, which is an estimate of the time required from the start of expansion process to the end of expansion process for the print data for the ath band (the same band as that in step S330), is calculated. In this case, the ath estimated expansion time $T_a$ could be calculated by using the same calculation method as that used in the previously-described grayscale depth modification process (FIG. 4). However, since the expansion processes have already been finished for black (K), magenta (M), and cyan (C) in S330, S340, and S350, the expansion times that were actually required in expansion processes in S330, S340, and S350 can be used. Thus, only the color-specific estimated time $T_{aY}$, which is an estimate of the time required for expanding the print data for the ath band into the yellow (Y) bitmap data, is calculated in S360, and the ath estimated expansion time $T_a$ is calculated by adding the color-specific estimated time $T_{aY}$ to the expansion times actually required in S330, S340, and S350.

In S370, it is determined whether or not a print overrun would occur in the print engine 20 if the expansion process were performed with the estimated expansion time $T_a$ calculated in S360.

More specifically, an ath expansion time limit $L_a$ is previously determined. The ath expansion time limit $L_a$ is a time limit from the start of expansion process to the end of expansion process for the print data for the ath band and makes it possible to prevent the occurrence of a print overrun during the expansion process that is executed in the sequence of the print data for the first band, the print data for the second band, the print data for the third band, the print data for the fourth band, and finally the print data for the fifth band.

If the ath estimated expansion time $T_a$ is equal to or less than the ath expansion time limit $L_a$, then it is determined in S370 that a print overrun will not occur. On the other hand, if the ath estimated expansion time $T_a$ is greater than the ath expansion time limit $L_a$, then it is determined in S370 that a print overrun will occur.

If it is determined in S370 that a print overrun would occur (S370:YES), then the process proceeds to S380. In S380, the grayscale depth used during the expansion of the print data expressing the yellow (Y) image into bitmap data is reduced by 2 bits for the ath band. Then, the process returns to S360 to perform the previously-described process. In other words, the grayscale depth for yellow (Y) in the ath band is reduced until it can be determined that a print overrun will not occur.

On the other hand, if it is determined in S370 that a print overrun will not occur (S370:NO), then the process proceeds to S390. In S390, process is performed for expanding the print data for the ath band into yellow (Y) bitmap data at the currently-set resolution and grayscale depth. Note that the bitmap data for the four colors in the ath band that has been expanded into the first bitmap expansion area 16b (or the second bitmap expansion area 16c) is output to the print engine 20, and the print engine 20 prints on the basis of the bitmap data. During that time, the expansion process for the next band is executed in parallel as mentioned previously.

Next in S400, it is determined whether or not the counter value of the counter a is 5.

If it is determined in S400 that the counter value of the counter a is not 5 (in other words, if the counter value is 1 to 4) (S400:NO), then the process proceeds to S410. In S410, the counter value of the counter a is incremented by 1, and then the process returns to S330.

On the other hand, if it is determined in S400 that the counter value of the counter a is 5 (in other words, if the process of S330 to S390 has been repeated five times) (S400:YES), then the yellow grayscale depth modification process ends.

As described above, in the yellow grayscale depth modification process, expansion process is performed at the set resolution and grayscale depth without estimating the expansion times for colors other than yellow (Y). Then, before performing the expansion process for yellow (Y), the ath estimated expansion time $T_a$ (time required from the start of the expansion process to the end of the expansion process for the ath band) is calculated, and the grayscale depth for yellow (Y), which is a color that is often used when representing color images, is reduced in accordance with the ath estimated expansion time $T_a$.

In this manner, in the yellow grayscale depth modification process, the estimated expansion time $T_a$ can be more accurately calculated by using the actual expansion times for black (K), magenta (M), and cyan (C). Also, the time required for calculating the estimated expansion time $T_a$ can be shortened. Furthermore, it possible to ensure that any degradation in the quality of printed images is difficult to perceive, because the only grayscale depth that is reduced is that of yellow (Y), which is the color that is least obvious of the four colors.

If the estimated expansion time $T_a$ is not calculated in the above-described yellow grayscale depth modification process (S360 in FIG. 6), then the total process time can be further curtailed, which is effective in preventing the occurrence of print overrun.

Figure 7:
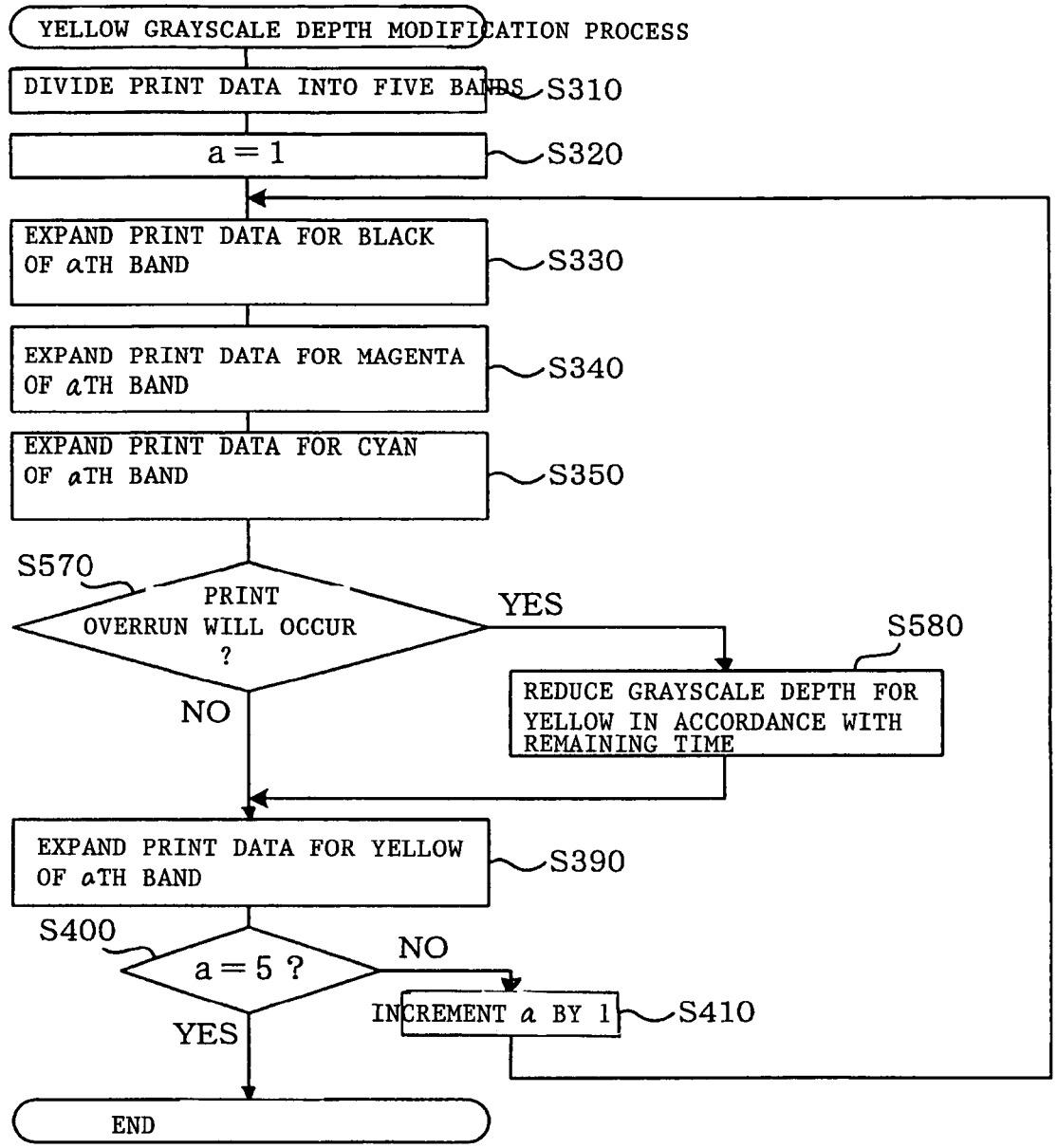
FIG. 7 is a flowchart of a yellow grayscale depth modification process according to a modification of the second embodiment.

The description now turns to yellow grayscale depth modification process according to a modification of the second invention that is done without calculating the estimated expansion time $T_a$, with reference to the flowchart of FIG. 7. Note that the steps of the yellow grayscale depth modification process of FIG. 7 that are the same as those in the yellow grayscale depth modification process of FIG. 6 are given the same reference numbers and further description thereof is omitted.

When the yellow grayscale depth modification process according to the present modification starts, first in S310, the print data received from the host computer 2 is divided into five bands (FIG. 3). Next in S320, a counter a is set to 1. In S330, the print data for the ath band is expanded to bitmap data for black (K) at the currently set resolution and grayscale depth.

In S340, the print data for the ath band is expanded to bitmap data for magenta (M) at the currently set resolution and grayscale depth. Then, in S350, the print data for the ath band is expanded to bitmap data for cyan (C) at the currently set resolution and grayscale depth.

In S570, it is determined whether or not a print overrun would occur in the print engine 20.

More specifically, an ath expansion time limit $L_a$ has previously been determined. The ath expansion time limit $L_a$ is a time limit from the start of expansion process to the end of expansion process for the print data for the ath band and that makes it possible to prevent the occurrence of print overrun during the expansion process that is executed in the sequence of the print data for the first band, the print data for the second band, the print data for the third band, the print data for the fourth band, and finally the print data for the fifth band.

A remaining time $L_{aY}$ that can be used in the expansion process for yellow (Y) in the ath band is calculated by deducting the expansion times actually required in the expansion processes in S330, S340, and S350 (the expansion processes that were performed before the expansion process for yellow (Y) in the ath band) from the ath expansion time limit $L_a$.

Then, it is determined whether or not the remaining time $L_{aY}$ is equal to or greater than a previously-determined reference expansion time. If the remaining time $L_{aY}$ is equal to or greater than the reference expansion time, then it is determined in S570 that a print overrun will not occur (S570:NO). However, if the remaining time $L_{aY}$ is less than the reference expansion time, then it is determined in S570 that a print overrun will occur (S570:YES). Note that the reference expansion time is set to be one-quarter (25%) of the expansion time limit for the expansion process for the first band (in other words, the first expansion time limit $L_1$).

If it is determined in S570 that a print overrun would occur (S570:YES), then the process proceeds to S580 in which the grayscale depth during the expansion into bitmap data of the print data representing the yellow (Y) image for the ath band is reduced in accordance with the remaining time $L_{aY}$. More specifically, the grayscale depth is greatly reduced as the remaining time $L_{aY}$ becomes shorter. For example, the grayscale depth is reduced by 2 bits if the remaining time $L_{aY}$ is between 20% and 24% of the first expansion time limit $L_1$, and reduced by 4 bits if the remaining time $L_{aY}$ is between 15% and 19% thereof. Then, the process proceeds to S390.

On the other hand, if it is determined in S570 that a print overrun will not occur (S570:NO), then the process proceeds to S390. In S390, the print data for the ath band is expanded to bitmap data for yellow (Y) at the currently set resolution and grayscale depth.

In S400, it is determined whether or not the counter value of the counter a is 5. If not (S400:NO), then in S410, the counter value of the counter a is incremented by 1, and the process returns to S330. On the other hand, if so (S400: YES), then the yellow grayscale depth modification process ends.

As described above, according to the yellow grayscale depth modification process of FIG. 7, the time to estimate the expansion time $T_a$ is unnecessary.

While some exemplary embodiments of this invention have been described in detail, those skilled in the art will recognize that there are many possible modifications and variations which may be made in these exemplary embodiments while yet retaining many of the novel features and advantages of the invention.

For example, it is not just the grayscale depth that can be reduced when it is determined that a print overrun would occur. The resolution could be reduced instead of the grayscale depth. More specifically, when the resolution is set to 1200 dpi×1200 dpi, the resolution could be reduced to 1200 dpi×600 dpi. When the resolution is set to 1200 dpi×600 dpi, the resolution could be reduced to 600 dpi×600 dpi.

Alternatively, both the resolution and the grayscale depth could be reduced. Still alternatively, a reduction in the grayscale depth, a reduction in the resolution, or a reduction in both the grayscale depth and the resolution could be selected, depending on the length of the estimated expansion times.

Furthermore, the present invention can also be applied to a configuration in which dedicated color hard renderers are used, as in the device disclosed in Japanese Patent Application-Publication No. 2001-10123, and in which the expansion process is performed in parallel for each print color. In other words, since the concept of this invention relates to a reduction in the grayscale depth or resolution of some of a plurality of colors, the grayscale depth or resolution could be reduced for only the data for which it has been determined that the estimated expansion times are long, even with the above-described configuration disclosed in Japanese Patent Application-Publication No. 2001-10123.

What is claimed is:

1. An image forming device comprising:
    an expansion unit that performs an expansion process for expanding drawing data representing a color image into bitmap data at a resolution and a grayscale depth, the color image being expressed by a plurality of colors;
    an image forming unit that forms an image based on the bitmap data;
    a calculating unit that calculates an estimated expansion time required by the expansion unit to perform the expansion process for at least part of the drawing data;
    a determining unit that determines based on the estimated expansion time whether or not the image forming unit can form the image normally; and
    a reducing unit that reduces at least one of the resolution and the grayscale depth for at least one of the plurality of colors at which the expansion unit performs the expansion process if the determining unit determines that the image forming unit cannot form the image normally.

2. The image forming device according to claim 1, wherein the determining unit determines that the image forming unit cannot form the image normally if the estimated expansion time exceeds an expansion time limit.

3. The image forming device according to claim 2, wherein the expansion time limit is a time that prevents occurrence of a print overrun in the image forming unit.

4. The image forming device according to claim 2, wherein the expansion time limit is a predetermined time limit.

5. The image forming device according to claim 1, wherein the reducing unit reduces at least one of the resolution and the grayscale depth for a necessary minimum number of colors of the plurality of colors.

6. The image forming device according to claim 5, wherein the reducing unit selects the necessary minimum number of colors by a predetermined priority sequence.

7. The image forming device according to claim 5, wherein the calculating unit calculates the estimated expansion time before the expansion unit performs the expansion process.

8. The image forming device according to claim 1, wherein the calculating unit calculates the estimated expansion time after the expansion unit has performed a part of the expansion process, the calculating unit calculates the estimated expansion time using an expansion time actually required for the part of the expansion process that has already been performed by the expansion unit.

9. The image forming device according to claim 8, wherein the expansion unit performs the expansion process for each color of the plurality of colors in a predetermined sequence, and the calculation unit calculates the estimated expansion time after the expansion process for a second from last color of the sequence has ended but before the expansion process for a final color of the sequence starts.

10. The image forming device according to claim 1, wherein the reducing unit changes a degree of reduction of the at least one of the resolution and the grayscale depth in accordance with the estimated expansion time.

11. The image forming device according to claim 1, wherein the reducing unit selects a reduction of the resolution alone, or a reduction of the grayscale depth alone, or reductions of both the resolution and the grayscale depth, in accordance with the estimated expansion time.

12. The image forming device according to claim 1, wherein the expansion unit divides the image data into a plurality of areas and performs expansion process for each area, and the calculation unit calculates the estimated expansion time which is required by the expansion unit to perform the expansion process for one or more of the plurality of areas.

13. The image forming device according to claim 1, wherein the reducing unit reduces the at least one of the resolution and the grayscale depth for at least one of the plurality of colors in which reduction in the resolution and the grayscale level is less perceivable.

14. The image forming device according to claim 1, wherein the at least one of the plurality of colors includes yellow.

15. An image forming device comprising:
    an expansion unit that performs an expansion process for expanding drawing data representing a color image into bitmap data at a resolution and a grayscale depth, the color image being expressed by a plurality of colors;
    an image forming unit that forms an image based on the bitmap data;
    a calculating unit that calculates a remaining time by subtracting an expansion time required for the expansion process that has already been performed by the expansion unit from an expansion time limit;
    a determining unit that determines whether or not the remaining time is less than a predetermined reference expansion time; and
    a reducing unit that reduces at least one of the resolution and the grayscale depth at which the expansion unit performs the expansion process for at least one of the plurality of colors, if the determining unit determines that the remaining time is less than the predetermined reference expansion time.

16. The image forming device according to claim 15, wherein the expansion time limit is to a time that prevents occurrence of a print overrun in the image forming unit.

17. The image forming device according to claim 15, wherein the expansion time limit is a predetermined time limit.

18. The image forming device according to claim 15, wherein the expansion unit performs the expansion process for each color of the plurality of colors in a predetermined sequence, and the calculation unit calculates the remaining time after the expansion process for a second from last color of the sequence has ended but before the expansion process of a final color of the sequence starts.

19. The image forming device according to claim 15, wherein the reducing unit changes a degree of reduction of the at least one of the resolution and the grayscale depth in accordance with the remaining time.

20. The image forming device according to claim 15, wherein the reducing unit selects a reduction of the resolution alone, or a reduction of the grayscale depth alone, or reductions of both the resolution and the grayscale depth, in accordance with the remaining time.

21. The image forming device according to claim 15, wherein the expansion unit divides the image data into a plurality of areas and performs expansion process for each area, and the calculating unit calculates the remaining time by subtracting the expansion time required for the expansion process that has already been performed by the expansion unit for one of the plurality of areas from the expansion time limit.

22. The image forming device according to claim 15, wherein the reducing unit reduces the at least one of the resolution and the grayscale depth for at least one of the plurality of colors in which reduction in the resolution and the grayscale level is less perceivable.

23. The image forming device according to claim 15, wherein the at least one of the plurality of colors includes yellow.

\* \* \* \* \*